United States Patent
Morris et al.

(10) Patent No.: US 9,239,119 B2
(45) Date of Patent: Jan. 19, 2016

(54) DIAPHRAGM AND DIAPHRAGM VALVE

(75) Inventors: Georgina E. Morris, Chester Hill (AU); Christopher W. Shorey, Blaxland (AU)

(73) Assignee: Goyen Controls Co. Pty. Ltd., New South Wales (AU)

( * ) Notice: Subject to any disclaimer, the term of this patent is extended or adjusted under 35 U.S.C. 154(b) by 795 days.

(21) Appl. No.: 13/508,590

(22) PCT Filed: Nov. 9, 2010

(86) PCT No.: PCT/AU2010/001490
§ 371 (c)(1),
(2), (4) Date: Oct. 30, 2012

(87) PCT Pub. No.: WO2011/054061
PCT Pub. Date: May 12, 2011

(65) Prior Publication Data
US 2013/0119289 A1    May 16, 2013

(30) Foreign Application Priority Data
Nov. 9, 2009   (AU) .............................. 2009905476

(51) Int. Cl.
*F16K 7/17*   (2006.01)

(52) U.S. Cl.
CPC ...................... *F16K 7/17* (2013.01)

(58) Field of Classification Search
CPC ...................................................... F16K 7/17
USPC ............ 251/28, 331, 61–61.5, 40, 33; 92/99, 92/96, 100
See application file for complete search history.

(56) References Cited

U.S. PATENT DOCUMENTS

| | | | | |
|---|---|---|---|---|
| 763,714 | A | * | 6/1904 | Boekel ............................ 417/46 |
| 769,050 | A | * | 8/1904 | Boekel ..................... 137/505.41 |
| 2,537,308 | A | * | 1/1951 | Hansen ......................... 251/331 |
| 2,942,550 | A | | 6/1960 | Carter |
| 2,971,470 | A | | 2/1961 | Wein et al. |
| 2,991,723 | A | | 7/1961 | Zubaty |
| 3,077,118 | A | | 2/1963 | Robbins |

(Continued)

FOREIGN PATENT DOCUMENTS

| | | | |
|---|---|---|---|
| DE | 1907454 A1 | 9/1969 | |
| GB | 654636 A | 6/1951 | |

(Continued)

OTHER PUBLICATIONS

International Search Report, Jan. 19, 2011, 3 pages.

*Primary Examiner* — Kevin Murphy
*Assistant Examiner* — David Colon Morales
(74) *Attorney, Agent, or Firm* — Quarles & Brady LLP (57) ABSTRACT

There is disclosed a diaphragm for a high pressure gas diaphragm valve. The diaphragm comprises a sealing body defining a sealing face for seating against a valve seat of the valve to close the valve; an outer flange for attaching the diaphragm to the valve, the outer flange defining a flange plane; and a deformable web that extends between the outer flange and the sealing body, the deformable web including a gusset that has at least one convolute portion. The gusset is deformable to allow the sealing body to move between a natural configuration in which the sealing body is on a first side of the flange plane, and a raised configuration in which at least part of the sealing body is on the opposing side of the flange plane, and wherein the at least one convolute portion biases the sealing body towards the natural configuration.

20 Claims, 9 Drawing Sheets

(56) References Cited

U.S. PATENT DOCUMENTS

| | | | |
|---|---|---|---|
| 3,192,782 A * | 7/1965 | Wantz | 403/51 |
| 3,314,600 A | 4/1967 | Hadley | |
| 3,496,872 A | 2/1970 | Riester et al. | |
| 3,508,735 A * | 4/1970 | Reis | 251/61.4 |
| 3,572,375 A | 3/1971 | Rosenberg | |
| 3,593,956 A * | 7/1971 | McCarty, Jr. | 251/30.03 |
| 3,684,406 A | 8/1972 | Edwards | |
| 3,920,216 A * | 11/1975 | Barnum et al. | 251/51 |
| 4,153,391 A | 5/1979 | Hartley | |
| 4,242,061 A | 12/1980 | Hartley | |
| 4,305,702 A | 12/1981 | Hartley | |
| 4,396,357 A | 8/1983 | Hartley | |
| 4,486,151 A | 12/1984 | Korhonen-Wesala | |
| 4,507,058 A | 3/1985 | Schoenmeyr | |
| 4,545,735 A | 10/1985 | Ims | |
| 4,550,749 A | 11/1985 | Krikorian | |
| 4,610,605 A | 9/1986 | Hartley | |
| 4,646,781 A | 3/1987 | McIntyre et al. | |
| 4,711,224 A | 12/1987 | Eckhardt | |
| 4,743,169 A | 5/1988 | Funakawa et al. | |
| 4,776,776 A | 10/1988 | Jones | |
| 4,797,069 A | 1/1989 | Hartley et al. | |
| 5,090,659 A * | 2/1992 | Bronnert | 251/61.1 |
| 5,108,067 A * | 4/1992 | Straub | 251/45 |
| 5,177,579 A * | 1/1993 | Jerman | 73/724 |
| 5,203,803 A | 4/1993 | Schoenmeyr | |
| 5,217,043 A * | 6/1993 | Novakovic | 137/460 |
| 5,301,663 A | 4/1994 | Small, Jr. | |
| 5,325,885 A | 7/1994 | Ivan et al. | |
| 5,344,292 A | 9/1994 | Rabenau et al. | |
| 5,476,367 A | 12/1995 | Zimmermann et al. | |
| 5,529,280 A * | 6/1996 | Satoh et al. | 251/61.1 |
| 5,601,112 A | 2/1997 | Sekiya et al. | |
| 5,649,812 A | 7/1997 | Schoenmeyr et al. | |
| 5,758,863 A * | 6/1998 | Buffet et al. | 251/28 |
| 5,791,882 A | 8/1998 | Stucker et al. | |
| 5,860,449 A | 1/1999 | Schulte | |
| 6,048,183 A | 4/2000 | Meza | |
| 6,058,970 A * | 5/2000 | Osaki et al. | 137/587 |
| 6,095,484 A * | 8/2000 | Frenkel | 251/61.1 |
| 6,298,872 B1 * | 10/2001 | Keller | 137/360 |
| 6,299,128 B1 * | 10/2001 | Verdecchia | 251/40 |
| 6,655,257 B1 * | 12/2003 | Meyer | 92/99 |
| 7,165,575 B2 * | 1/2007 | Nakamura | 137/613 |
| 7,681,860 B2 * | 3/2010 | Maercovich | 251/30.04 |
| 2004/0041119 A1 * | 3/2004 | Christen et al. | 251/331 |
| 2005/0205815 A1 | 9/2005 | Frenkel | |
| 2006/0016494 A1 * | 1/2006 | Irwin et al. | 137/625.28 |
| 2008/0289693 A1 * | 11/2008 | Irwin et al. | 137/12 |

FOREIGN PATENT DOCUMENTS

| | | |
|---|---|---|
| GB | 831273 | 3/1960 |
| GB | 2250802 | 6/1992 |
| JP | 2002-364766 | 12/2002 |
| JP | 2005-030553 | 2/2005 |
| WO | 9514874 A1 | 6/1995 |

\* cited by examiner

DIAPHRAGM AND DIAPHRAGM VALVE

FIELD OF THE INVENTION

The present invention relates to diaphragms for high pressure gas diaphragm valves and to high pressure gas diaphragm valves.

BACKGROUND OF THE INVENTION

High pressure gas diaphragm valves are used in a wide variety of applications. Depending on their use, diaphragm valves can be exposed to high and low temperatures, temperature fluctuations across a wide temperature range, high and low pressures, and corrosive liquids or gases.

In addition to being suited to such conditions, the diaphragm of a diaphragm valve needs to be flexible and durable. Durability is important as regularly replacing diaphragms is typically a logistically difficult and expensive procedure. In use, a diaphragm may not be readily accessible, making replacement difficult. In order to replace a diaphragm it is generally necessary to suspend operation of the plant or machine of which the diaphragm is part. In some applications, especially those which require sterile or inert environments, diaphragm failure can contaminate the batch being produced and make it unsuitable for use.

Diaphragms are typically made, at least in part, from synthetic elastomers. One type of diaphragm consists of a central valve closure disk formed from a hard, inflexible material, such as metal, rigid plastic or a combination of metal and rigid plastic, supported on a flexible impervious fabric reinforced web. Such diaphragms are typically used in conjunction with a spring to ensure valve closure. The fabric may typically be nylon or the like. The fabric may be coated or laminated between sheets of Viton®, a fluoroelastomer available from DuPont Dow Elastomers, or Nitrile, also known as Buna-N, an acrylonitrile-butadiene copolymer. Both Viton® and Nitrile have good temperature and chemical resistance. However, such fabric reinforced diaphragms are subject to delamination and wicking of the nylon fibres, resulting in leakage and/or poor durability.

Moulded plastic diaphragms are an alternative to the fabric reinforced diaphragms. One moulded plastic diaphragm currently available is composed of Hytrel® (DuPont). Hytrel® is a thermoplastic polyester elastomer. However, Hytrel® is not suitable for use in applications where severe operating conditions may be experienced, as it has a low maximum operating temperature, approximately 60° C., a narrow range of chemical resistivity and is not particularly durable.

Moulded plastic diaphragms have also been made from high density polyethylene. These diaphragms are subject to early fatigue failure and are not resistant to high temperatures.

It would be desirable to provide a diaphragm that overcomes or ameliorates one or more disadvantages of existing diaphragms. Alternatively, it would be desirable to provide consumers with a useful choice.

SUMMARY OF THE INVENTION

The present invention provides a diaphragm for a high pressure gas diaphragm valve, the diaphragm comprising:
   a sealing body defining a sealing face for seating against a valve seat of the valve to close the valve;
   an outer flange for attaching the diaphragm to the valve, the outer flange defining a flange plane; and
   a deformable web that extends between the outer flange and the sealing body, the deformable web including a gusset that has at least one convolute portion,
   wherein the gusset is deformable to allow the sealing body to move between a natural configuration in which the sealing body is on a first side of the flange plane, and a raised configuration in which at least part of the sealing body is on the opposing side of the flange plane, and wherein the at least one convolute portion biases the sealing body towards the natural configuration.

In some embodiments, when the sealing body is in the natural configuration, the surface of the at least one convolute portion has a local extremum that is located between the flange plane and the sealing face.

The gusset may be asymmetric about the flange plane.

The gusset may include two convolute portions.

The gusset may have a substantially S-shaped radial profile.

In some embodiments in which the gusset includes two convolute portions, when the sealing body is in the natural configuration, the intersection between the convolute portions is located between the flange plane and the sealing face.

The deformable web may further include an annular groove between the sealing body and the gusset, and the diaphragm further comprises an o-ring that is located in the annular groove.

The diaphragm may further comprise a bleed hole for allowing gas to pass through the diaphragm.

The bleed hole may be located in the deformable web. In one alternative, the bleed hole may be located in the outer flange.

In some embodiments, the deformable web further includes at least one rib that protrudes from the gusset on the opposite side of the sealing body to the sealing face and extends partly around the sealing body, such that when the sealing body is in a raised configuration, the rib spaces the gusset from the valve body and inhibits formation of a seal between the gusset and the valve body.

The diaphragm may further comprise a reinforcing plug for reinforcing the sealing body.

The reinforcing plug may have a stem that extends at least partially through the sealing body in a direction perpendicular to the flange plane. In certain embodiments, the stem extends through the sealing body.

In certain embodiments, the reinforcing plug further comprises a generally planar flange that abuts the sealing body and is disposed on the opposite side of the sealing body to the sealing face.

In some embodiments, when the sealing body is in the natural configuration, a clearance is provided between the gusset and the radially peripheral edge of the planar flange.

In certain embodiments, the reinforcing plug includes a detent that projects radially from the stem, the detent for inhibiting movement of the stem through the sealing body in a direction away from the sealing face.

The reinforcing plug may comprise a cutting edge that depends from the stem, the cutting edge, during assembly of the diaphragm, cuts an aperture through a central portion of the sealing body.

In certain embodiments, the outer flange, deformable web, and sealing body are of unitary construction.

The outer flange, web, and sealing body may be moulded from a thermoplastic material. The thermoplastic material may be Santoprene™.

The reinforcing plug may be manufactured from a co-polymer acetyl material. In some embodiments, the co-polymer acetyl material may include a glass fibre reinforcement.

The present invention also provides a high pressure gas diaphragm valve fitted with a diaphragm provided by the present invention as previously described.

The present invention may also provide a diaphragm blank for a high pressure gas diaphragm valve, the diaphragm comprising:
 a sealing body defining a sealing face for seating against a valve seat of the valve to close the valve;
 an outer flange for attaching the diaphragm to the valve, the outer flange defining a flange plane; and
 a deformable web that extends between the outer flange and the sealing body, the deformable web including a gusset that has at least one convolute portion,
 wherein the gusset is deformable to allow the sealing body to move between a natural configuration in which the sealing body is on a first side of the flange plane, and a raised configuration in which at least part of the sealing body is on the opposing side of the flange plane, and wherein the at least one convolute portion biases the sealing body towards the natural configuration.

The present invention also provides a method of assembling a diaphragm for use in a high pressure gas diaphragm valve, the method comprising:
 providing a diaphragm blank that includes sealing body defining a sealing face for seating against a valve seat of the valve to close the valve; an outer flange for attaching the diaphragm to the valve; and a deformable web that extends between the outer flange and the sealing body, the gusset is deformable to allow the sealing body to move between a natural configuration, and a raised configuration;
 providing a reinforcing plug that includes a stem and a detent that projects radially from the stem;
 creating an aperture that extends through the sealing body; and
 passing the reinforcing plug through the aperture such that the detent is located outside the aperture and against the sealing body.

In some embodiments in which the diaphragm blank includes a central portion, the method further comprises creating the aperture involves removing the central portion.

In some embodiments in which the reinforcing plug includes a cutting edge that depends from the stem, the method further comprises using the cutting edge to create the aperture concurrently with passing the reinforcing plug through the aperture.

All ranges stated in this specification are inclusive of the values forming the upper and lower boundaries of the stated range and of sub-ranges between the stated boundaries.

BRIEF DESCRIPTION OF THE DRAWINGS

The invention now will be described, by way of example only, and with reference to the accompanying drawings in which.

DETAILED DESCRIPTION OF THE EMBODIMENTS

Figure 1:
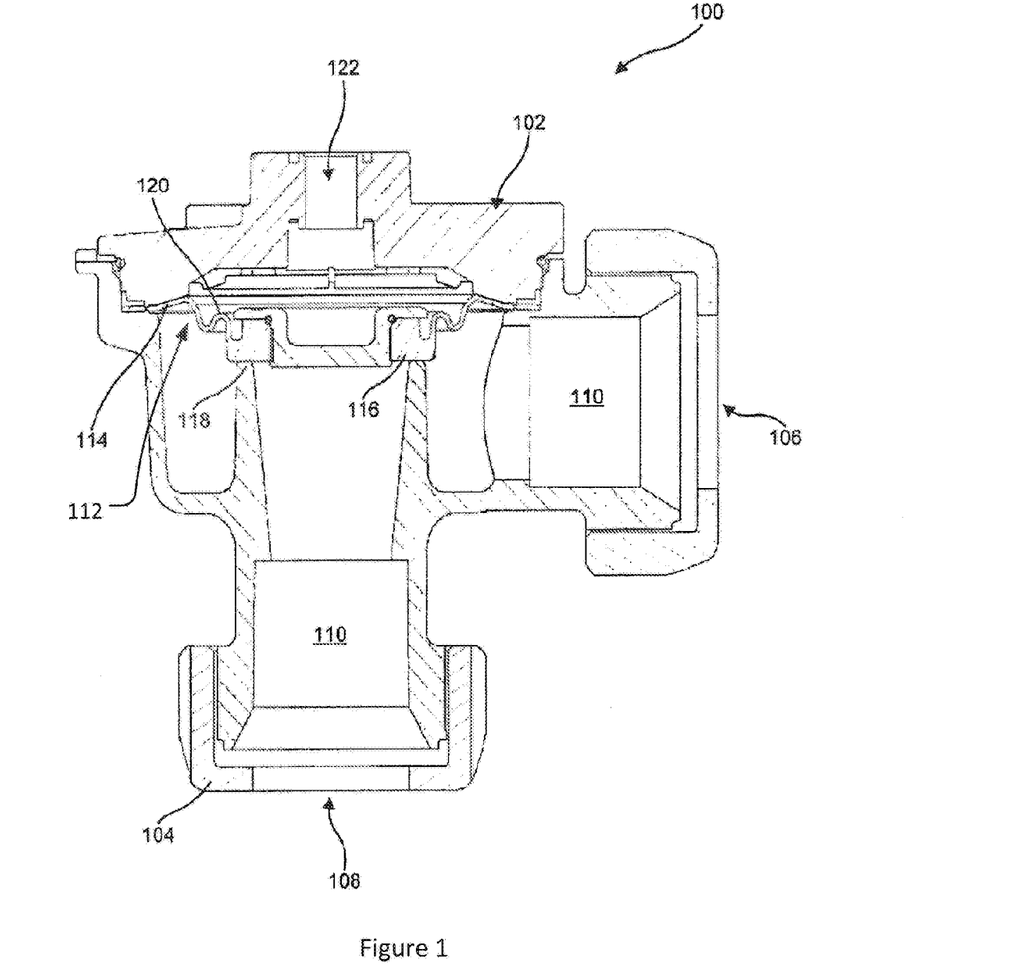
FIG. 1 is a sectional elevation view of a diaphragm valve with diaphragm in accordance with an embodiment of the invention installed, the diaphragm being in a rest configuration.

The present invention relates to diaphragms for use in diaphragm valves. FIG. 1 is a sectional elevation view of one type of high pressure gas diaphragm valve 100 suitable for use with embodiments of the present invention. The valve 100 includes an upper housing 102 and a lower housing 104 which are releasably secured together by way of screws, bolts or other fasteners (not shown). The valve 100 has an inlet 106 and an outlet 108 and defines a flow passage 110 therebetween.

Between the inlet 106 and outlet 108 a diaphragm 112 is positioned. The diaphragm 112 is secured in place between the upper and lower housings 102 and 104 via an outer flange 114, and includes a sealing body 116 adapted to locate on the valve seat 118. The diaphragm also includes a deformable web 120 extending between the flange 114 and sealing body 116.

The sealing body 116 defines a sealing face for seating against a valve seat 118 of the valve 100 to close the valve. The outer flange 114 defines a flange plane, which is perpendicular to the section illustrated in FIG. 1. The deformable web includes a gusset that has at least one convolute portion, and is deformable to allow the sealing body to move between a natural configuration in which the sealing body 116 is on a first side of the flange plane, and a raised configuration in which at least part of the sealing body 116 is on the opposing side of the flange plane. The at least one convolute portion biases the sealing body 116 towards the natural configuration.

The structure of the gusset is explained in further detail in connection with FIGS. 2A to 2D. However, as can be observed in FIG. 1, in this embodiment the gusset has two convolute portions.

Thus, the diaphragm 112 is able to achieve high lift between the closed and fully open positions, which facilitates high gas flow rates through the flow passage 110. Furthermore, the sealing body 118 of the diaphragm 110 is able to move from the raised configuration (an open position) towards the natural configuration (a closed position) by virtue of the bias provided by the at least one convolute portion.

The natural configuration corresponds with the position of the sealing body 116 relative to the outer flange 114 when no external loads are applied to the sealing body or deformable web 120, or when the external loads are in equilibrium.

In FIG. 1, the diaphragm 112 is shown with the sealing face seated against the valve seat 118 to prevent fluid flow through the flow passage 110. With the sealing body 116 in this position, the diaphragm 112 assumes a rest configuration, in which the sealing body 116 is slightly displaced from the natural configuration, in a direction towards the flange plane. In the rest configuration, the gusset provides a bias that presses the sealing face against the valve seat 118. This allows the diaphragm 112 maintain the sealing body in the rest position when the diaphragm 112 is subjected to minor transient pressure differentials, to compensate for manufacturing tolerances, and other factors that affect the quality of the seal.

The diaphragm 112 also has a deformed configuration in which the deformable web 120 is deformed and the sealing body 116 is lifted away from the valve seat 118, allowing fluid flow between the inlet 106 and outlet 108. The deformed configuration of the diaphragm 112 is assumed when uneven forces are applied to the diaphragm 112, for example by a pressure differential above and below the diaphragm 112.

The valve 100 also includes an opening 122 in the top housing 102 which can be used to introduce or release gas (air) in order to selectively maintain an equal pressure above and below the diaphragm 112 (allowing the diaphragm 112 to maintain its rest configuration and close the valve 100) or to create a pressure differential above and below the diaphragm (causing the diaphragm 112 to assume the deformed configuration and open the valve 100). For example, the gas pressure within the opening 122 can be lowered relative to the pressure within the flow passage 110 on the inlet side 106 of the valve seat, causing the sealing body 116 to lift from the valve seat 118 and allow gas to flow through the flow passage 110.

Diaphragms according to the present invention could, of course, be used with valves of alternative constructions to that described above.

Assembled Diaphragm

FIGS. 2A to 2D provide various views of a first embodiment of a diaphragm 200 suitable for use with the diaphragm valve 100 described above. As described, the diaphragm 200 includes a flange 202, a sealing body 204 and a deformable web 206 extending between the flange 202 and the sealing body 204.

Diaphragm 200 also includes a bleed hole 208 positioned in the web 206. In use, the bleed hole 208 allows fluid flow through the web 206 to allow the pressures above and below the diaphragm 200 to be adjusted.

Figure 2A:
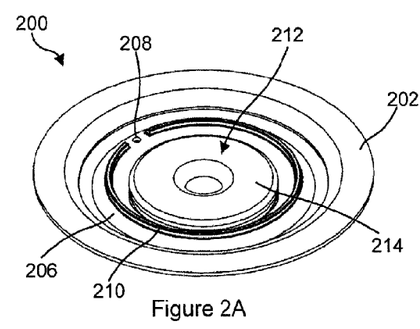
FIG. 2A is a top perspective view of a diaphragm in accordance with a first embodiment of the invention.
Figure 2B:
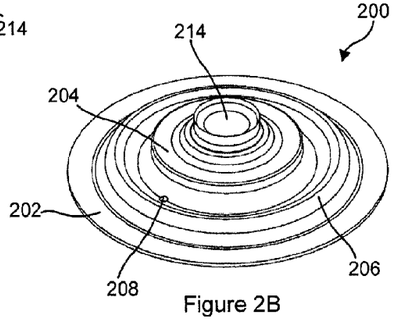
FIG. 2B is a bottom perspective view of the diaphragm of FIG. 2A.
Figure 2C:
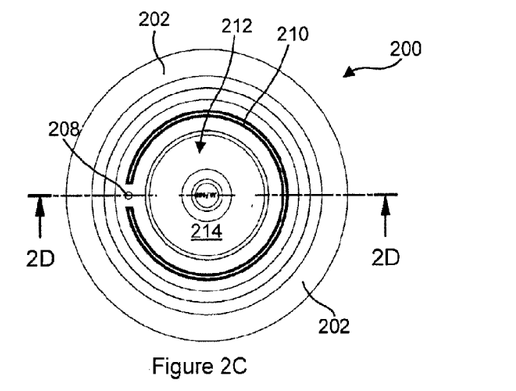
FIG. 2C is a plan view of the diaphragm of FIG. 2A.
Figure 3A:
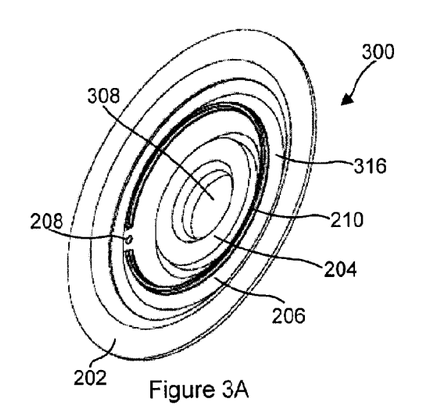
FIG. 3A is a top perspective view of a diaphragm blank from which the diaphragm of FIG. 2 may be assembled.
Figure 3B:
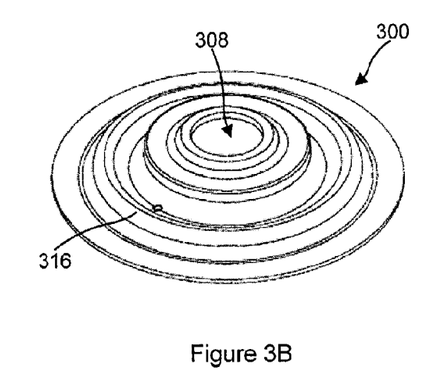
FIG. 3B is a bottom perspective view of the diaphragm blank of FIG. 3A.
Figure 3C:
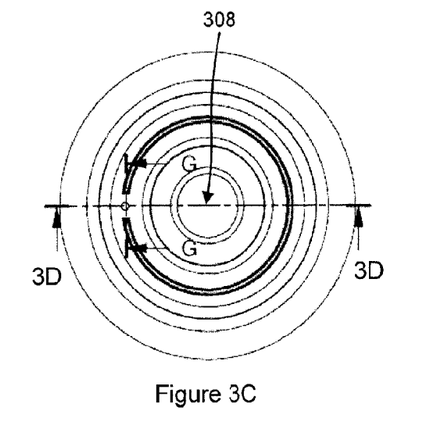
FIG. 3C is a plan view of the diaphragm blank of FIG. 3A.

The diaphragm 200 further includes a rib 210 formed on a top side of the web 206. As can be seen, the rib 210 is essentially annular in shape however does not extend the entire distance around the web 206. Rather, the rib 210 is broken in the vicinity of the bleed hole 208, and extends partly around the sealing body 204. While the precise dimensions of the rib 210 will depend on the intended use of the diaphragm, the rib 210 of the present embodiment is approximately 1 mm high. As can be seen in FIG. 3G the rib tapers away from the body of the diaphragm 200 and is approximately 1 mm wide at its peak.

When the diaphragm 200 is installed in a valve and in use, the rib 210 prevents the diaphragm 200 from forming a seal with the valve body when the diaphragm 200 opens by deforming upwardly. Absent such a rib 210 a seal could form, rendering it difficult to adjust the pressures above and below the diaphragm 200 to open/close the valve 100.

In use, the flange 202 is used to secure the diaphragm 200 in place in the valve 100. The outer flange 202 is clamped between the upper and lower housings 102 and 104 of the valve 100, securing the diaphragm 200 at its perimeter and supporting the sealing body 204 and the deformable web 206 within the valve body. The sealing body 204 defines a valve closure member which is arranged to contact and seal against the valve seat 118 of the valve when the valve is closed.

Both the sealing body 204 and the flange 202 of the diaphragm 200 can be designed in accordance with, and function similarly to, previously known diaphragms. Indeed, it is envisaged that a diaphragm of the present invention can be used as a substitute or replacement for prior art diaphragms in a conventional diaphragm valve, without requiring any adaptation of the valve.

Figure 2D:
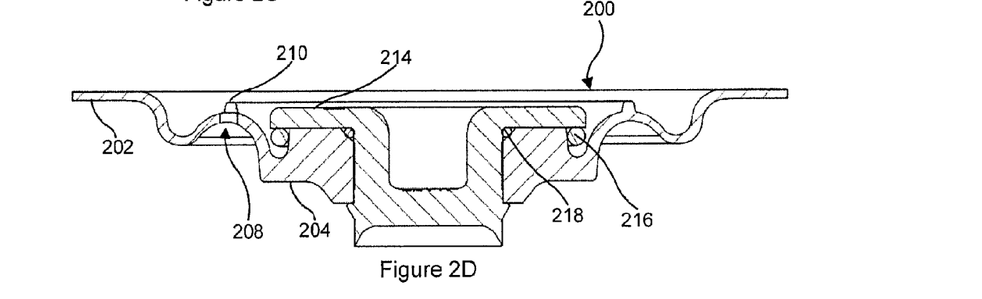
FIG. 2D is a sectional elevation view of the diaphragm of FIG. 2A taken along line 2D-2D of FIG. 2C, the diaphragm being in a natural configuration.

In order to maintain an adequate seal against the valve seat without deforming, it is desirable that the sealing body 204 be relatively rigid. To assist in achieving the required rigidity, and in this particular embodiment, the diaphragm 200 is fitted with a reinforcement assembly generally indicated by 212. The reinforcement assembly includes a plug 214 which passes through the centre 308 of the sealing body 204, an outer o-ring 216, and an inner o-ring 218. The inner o-ring 218 provides an additional seal between the sealing body 204 and the reinforcement assembly.

The deformable web 206 further includes an annular groove formed between the sealing body and the gusset. The outer o-ring 216 is located in the annular groove. The outer o-ring 216 provides support to the gusset as the sealing body 204 moves towards the rest configuration. In addition, the outer o-ring 216 can absorb energy as the sealing body 204 moves towards the rest configuration, and minimizes bouncing of the sealing body 204 on contact with the valve seat.

Assembly of the diaphragm 200 with the reinforcement assembly 212 will be described further below.

Diaphragm Blank

FIGS. 3A to 3G show a diaphragm blank 300 from which diaphragm 200 may be manufactured. As can be seen, the diaphragm blank 300 is pre-formed with the flange 202 that defines a flange plane, a sealing body 204, and a deformable web 206. The deformable web 206 includes a gusset 302, which includes a pair of convolute portions 322, 324.

In this embodiment, the diaphragm blank 300 also includes a bleed hole 208, and the deformable web 206 includes a rib 210.

In addition, and to facilitate assembly of the diaphragm blank 300 with a reinforcing plug 214 as described below, the diaphragm blank includes a central portion 308 which, in assembly, is removed from the blank 300. The blank 300 is further provided with a lower shoulder 310, an upper shoulder 312, and a chamfer 314 against which the inner a-ring 218 can be located. The pair of convolute portions form a corrugation 316 such that the gusset has a substantially S-shaped radial profile.

The deformable web 206 of the diaphragm 200 will now be described in further detail with reference to FIG. 3E. Generally speaking, and in this particular embodiment, the deformable web 206 includes a gusset 302 that can be deformed to allow the sealing body 204 to move perpendicularly to the general plane of the diaphragm (i.e. up and down if the diaphragm is oriented as shown in FIG. 2D).

In the specific embodiment illustrated, and in the natural configuration of the diaphragm blank 300 (and hence of a diaphragm formed from the blank 300), the flange 202 extends into a lower radius 318, which in turn extends into an upper radius 320. The lower and upper radii 318 and 320 are such that gusset 302 (in its natural configuration) forms radially outer and inner convolute portions 322 and 324, respectively, and provide the gusset 302 with the substantially S-shaped radial profile.

Figure 3D:
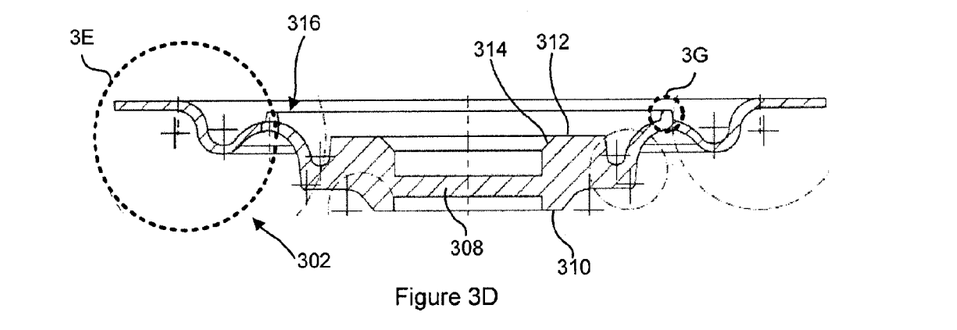
FIG. 3D is a sectional elevation view of the diaphragm blank of FIG. 3A taken along line 3D-3D.
Figure 3E:
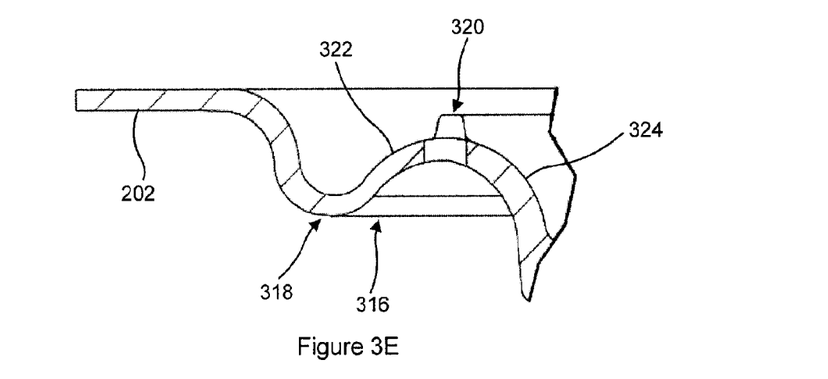
FIG. 3E is a view of the region of the diaphragm blank marked as 3E in FIG. 3D with the deformable web in a natural configuration.
Figure 5:
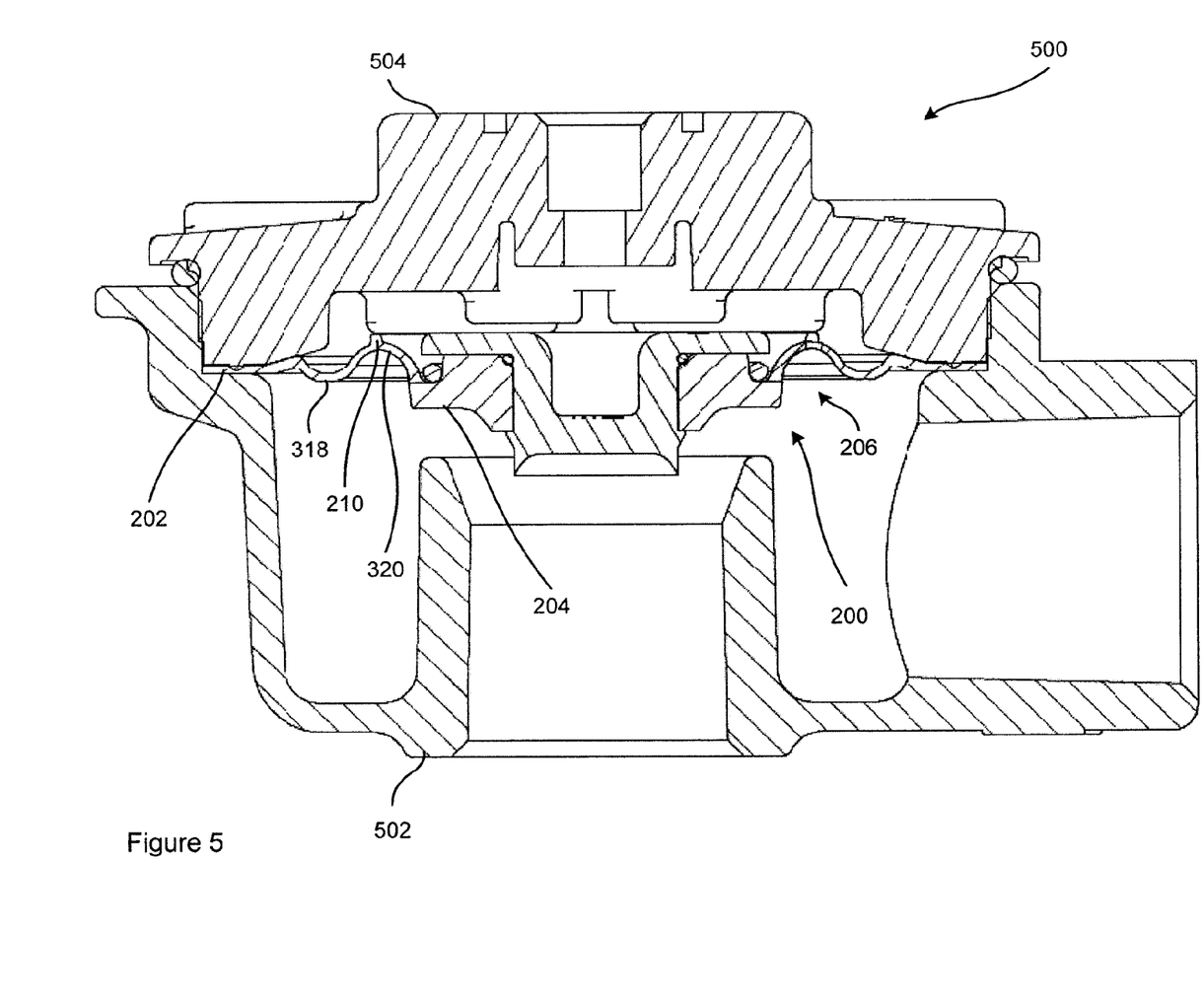
FIG. 5 is a sectional elevation view of the diaphragm valve according to FIG. 1, with the sealing body of the diaphragm being in a raised configuration.

With the bias towards its natural configuration (as shown in FIG. 3D) the deformable web 206 urges the sealing body 204 towards a closed position (i.e. the position that would close a valve in which the diaphragm is installed). Under unbalanced pressure, however (and as shown in FIG. 5), the lower and upper radii 318 and 320 of the gusset 302 deform to displace the sealing body 204 from the valve seat thereby opening the valve.

The exact form and configuration of the gusset 302 will depend on the design and performance parameters required for the diaphragm 200. A diaphragm which is required to move only a short distance away from the valve seat to its fully open position may require only a relatively shallow gusset 302. If a greater opening stroke is required the S-shaped profile as illustrated will be appropriate. The pair of convolute portions provide for relatively even stress conditions to be experienced at all regions of the diaphragm 200. This in turn increases the lifespan of the diaphragm 200.

As will be appreciated from the figures, the pair of convolute portions 322, 324 are concave in opposing directions. The radially outer convolute portion 322 is concave in a direction away from the sealing face, and the radially inner convolute portion 324 is concave in a direction towards the sealing face. In addition, convolute portions 322, 324 form annular grooves or channels around the sealing body 204.

When the diaphragm 200 is in its natural configuration, the radially outer convolute portion 322 has a local extremum that is located between the flange plane and the sealing face. Thus, the local extremum forms a circle that is, within the radially outer convolute portion 322, a maximum distance from the flange plane. Similarly, in this embodiment, when the diaphragm 200 is in its natural configuration, the radially inner convolute portion 324 has a local extremum that is also located between the flange plane and the sealing face. Thus, the local extremum forms a circle that is, within the radially inner convolute portion 324, a minimum distance from the flange plane.

In the embodiment illustrated in FIGS. 3A to 3G, when the diaphragm blank 300 is in its natural configuration, the radially outer convolute portion 322 has the shape of a concave channel that extends annularly around the sealing body 204. The centre of concavity of the radially outer convolute portion 322 extends around a circle that is concentric with the sealing body 204. The distance from the flange plane to that circle is approximately one quarter of the distance from the flange plane to the sealing face.

In addition, in the embodiment illustrated in FIGS. 3A to 3G, when the diaphragm blank 300 is in its natural configuration, the radially inner convolute portion 324 also has the shape of a concave channel that extends annularly around the sealing body 204 (with a direction of concavity that is opposite to that of the radially outer convolute portion 322). The centre of concavity of the radially inner convolute portion 324 also extends around a circle that is concentric with the sealing body 204. In this embodiment, the circle that includes the centre of concavity of the radially inner convolute portion 324 is between the circle that includes the centre of concavity of the radially outer convolute portion 322 and the sealing face.

Further, and as noted above, the specific thickness of the material in the deformable web 206 and the shape of the gusset 302 will also depend on end-use factors such as the degree of flexibility required, the strength and durability required, the pressure the diaphragm will be subjected to in use, and the degree of movement required.

Figure 3F:
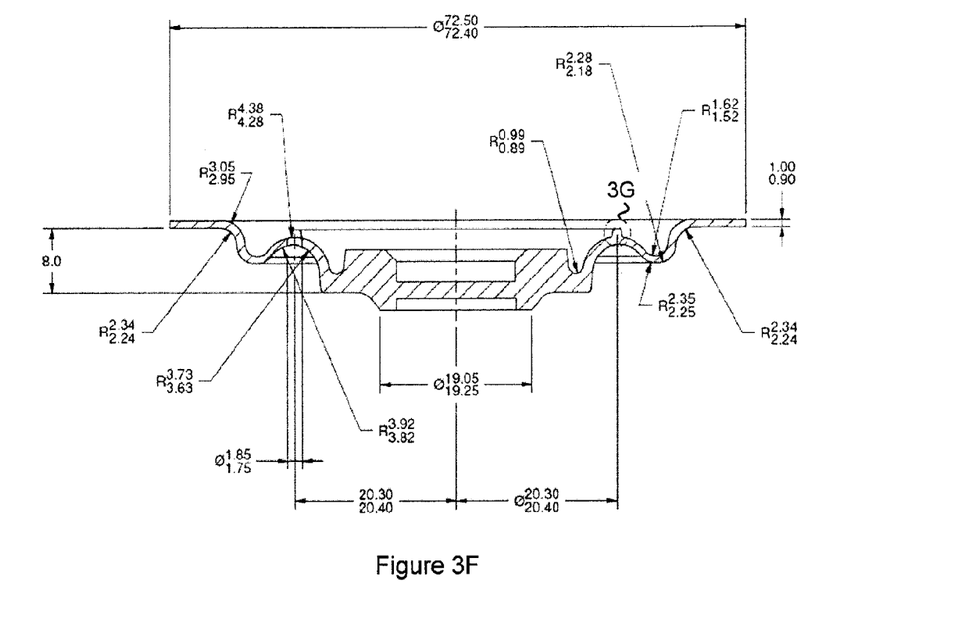
FIG. 3F is the partial section view corresponding with FIG. 3C in which various diaphragm parameters shown by way of non-limiting example.
Figure 3G:
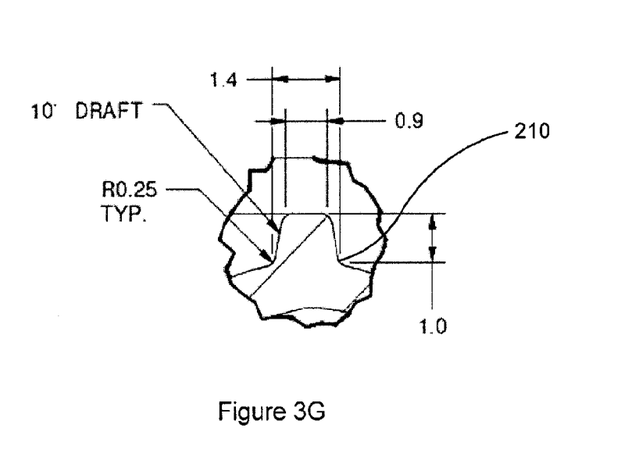
FIG. 3G is a view of the region of the diaphragm blank marked as 3G on FIG. 3B in which various diaphragm parameters shown by way of non-limiting example.

FIG. 3F is a view of diaphragm blank 300 with various dimensions and measurements in mm indicated. In FIG. 3F, the diaphragm blank 300 is in its natural configuration. The measurements provided in FIG. 3F are for a diaphragm to be used specifically with a Goyen® RCAC20-series of valves. As will be appreciated, and as noted above, the dimensions of any particular diaphragm will depend on the dimensions and operating parameters (such as pressure, temperature etc) of the valve with which the diaphragm will be used. Accordingly, it will be understood that the dimensions depicted in FIG. 3F are by way of non-limiting example only.

In this particular embodiment, the outer flange, deformable web, and sealing body of the diaphragm blank 300 is a one-piece unitary construction. In this embodiment, the diaphragm blank 300 is composed of a thermoplastic elastomer, for example as sold under the Trade Mark Santoprene. Alternative materials may, of course, be possible in some alternative embodiments, noting that the properties of the selected material (e.g. flexibility etc) must be taken into account when selecting parameters of the diaphragm such as the thickness and the radii in the web.

Santoprene, being a thermoplastic material, will be mouldable under conditions of high pressure and temperature. It is envisaged that the individual diaphragm blanks may be injection moulded in a multiple cavity die at temperatures in excess of 180° C. to shape the convolute portions and/or other flex enabling formations.

Reinforcing Assembly

To manufacture diaphragm 200, the diaphragm blank 300 is provided with a reinforcing assembly 212 to ensure that the sealing body 204 does not unduly deform during use.

In the present embodiment the reinforcing assembly includes a reinforcing plug 214 as shown in FIGS. 4A to 4D. The reinforcing plug 214 has a top hat section and includes a stem 402, a base 404, and a generally planar flange 406. The stem 402 in the present embodiment is of right circular cylindrical form.

The plug 214 is also provided with a detent 408 which, when fitted to the diaphragm blank 300, prevents the plug 214 from disengaging from the blank 300. Further, the diameter of the plug 214 is relatively larger than the diameter of the central hole 308 providing for an interference fit between the plug 214 and blank 300 when assembled. The detent 408 in this instance is provided on the stem 402 and includes annular rib having an inclined surface 410 extending radially outwardly and away from the base 404 of the plug 214. The inclined surface 410 terminates in a shoulder 412 extending generally normal to the longitudinal axis of the stem 402.

The reinforcing plug 214 of the present embodiment is also provided with a cutting edge 414 depending from the stem 402.

The reinforcing plug 214 may suitably be injection moulded from a copolymer acetyl material.

Assembly of the Diaphragm

Figure 4A:
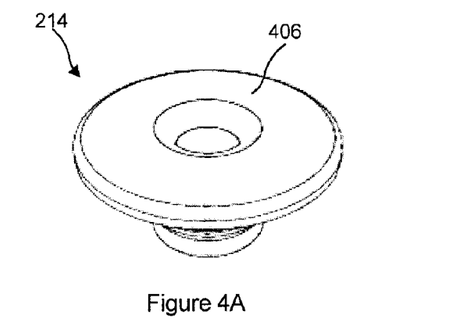
FIG. 4A is a top perspective view of a reinforcing plug for use with the diaphragm blank of FIG. 3.
Figure 4B:
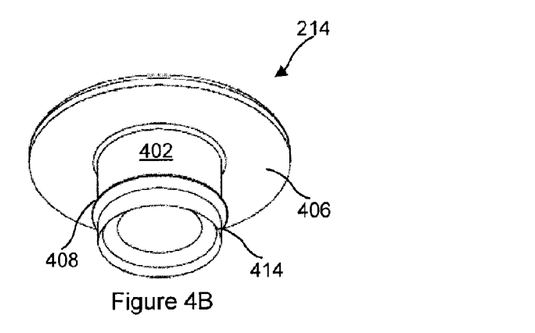
FIG. 4B is a bottom perspective view of the reinforcing plug of FIG. 4A.
Figure 4C:
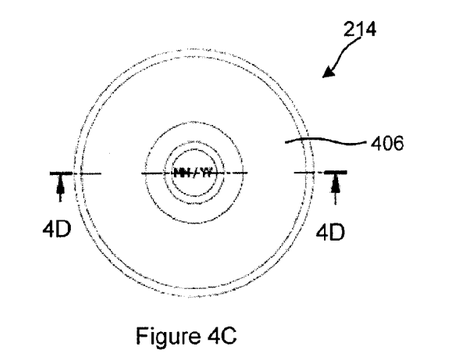
FIG. 4C is a plan view of the reinforcing plug of FIG. 4A.
Figure 4D:
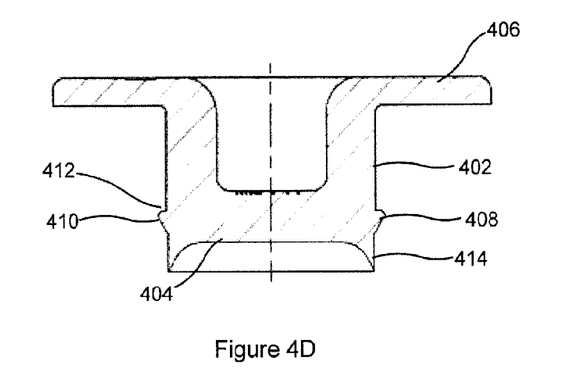
FIG. 4D is a sectional elevation view of the reinforcing plug of FIG. 4A taken along line 4D-4D of FIG. 4C.

In order to manufacture diaphragm 200 from the diaphragm blank 300 and the reinforcing assembly 212, the central portion 308 of the diaphragm blank 300 is removed and the reinforcing plug 214 passed through the aperture created. As the plug 214 is passed through the aperture, the inclined surface 410 of the detent 408 drives the adjacent material of the diaphragm blank 300 radially outwardly with advancement of the plug 214 through the blank 300 until the detent 408 has passed fully through the blank 300 and the shoulder 412 abuts with the complimentary shoulder 310 provided on the underside of the diaphragm blank 300.

To further reinforce the sealing body 204, and as can be seen in FIG. 2D, outer and inner o-rings 216 and 218 may be provided between the underside of the flange 406 of the plug 214 and the top-side of the sealing body 204 of the diaphragm 200. Specifically, the outer o-ring 216 locates in the annular groove surrounding the sealing body and beneath the flange 406. The inner o-ring 218 locates between the underside of the flange 406 and the inclined surface of the chamfer 314, and surrounds the stem 402.

The central portion 308 of the blank 300 may be cut or punched out using a cutting tool or punch as desired. Alternatively, the reinforcing plug 214 may itself provide the cutting edge, using cutting edge 414. In this instance, the central portion 308 of the blank 300 can be removed simply by urging the cutting edge 414 against the central portion 308 of the diaphragm blank 300, which severs the central portion 308 from the blank 300 and allows the reinforcing plug 214 to pass through the aperture as described above.

As will be appreciated by those skilled in the art, in order to form an effective diaphragm for a diaphragm valve, it is necessary that the reinforcing plug 214 to be sealingly engaged with the diaphragm blank 300 so as to prevent the passage of fluid between the plug 214 and the diaphragm blank 300. Due to the environment in which the diaphragm valve may be used, however, processes such as fusing and/or heating, or the use of adhesives, may not be suitable.

In the present embodiment, the plug 214 and the diaphragm blank 300 are suitably sized such that the underside of the flange 406 of the plug 214 is urged against the corresponding shoulder 312 of the diaphragm blank 300, and the shoulder 412 of the detent 408 is urged against surface 310 of the blank 300. This provides for sealing engagement between the blank 300 and plug 214 at least these two locations.

In the present embodiment, providing the plug 214 with a cutting edge 414 for removing the central portion 308 of the diaphragm blank 300 can provide a number of advantages:

(i) Machining is not required to provide the aperture through which the plug 214 extends, thus negating the necessity for correctly toleranced and finished apertures to be formed as part of a post-moulding processing.

(ii) The removal of excess material, formation of the aperture through which the plug 214 extends, insertion of the plug 214, and securement of the plug 214 in relation to the blank 300 are all achieved in the single process of urging the plug against and through the central portion 308 of the blank 300.

(iii) Sealing engagement between the plug 214 and blank 300 is provided via the fit between the plug 214 and blank and the inner o-ring 218 only.

These advantages provide significant cost savings due to reduction in manufacturing cycle time whilst providing a two part diaphragm in which the two parts are sealingly engaged so as to prevent the passage of fluid there between.

It is noted here that while providing the plug 214 with a cutting edge 414 and assembling the blank 300 and plug 214 as described above will be appropriate for some diaphragms, it may not be appropriate in all instances. For example, for larger diaphragms the cutting edge 414 may have an adverse impact on air flow around the diaphragm and through the valve. In such cases providing a plug without a cutting edge (as shown and discussed in the embodiments below) and removing the central portion 308 of the diaphragm blank by other means may be more appropriate.

Thus, a diaphragm can be assembled by:
providing a diaphragm blank that includes sealing body defining a sealing face for seating against a valve seat of the valve to close the valve; an outer flange for attaching the diaphragm to the valve; and a deformable web that extends between the outer flange and the sealing body, the gusset is deformable to allow the sealing body to move between a natural configuration, and a raised configuration;
providing a reinforcing plug that includes a stem and a detent that projects radially from the stem;
creating an aperture that extends through the sealing body; and
passing the reinforcing plug through the aperture such that the detent is located outside the aperture and against the sealing body.

Installation and Use

FIG. 5 provides a cut away perspective view of a valve 500 with diaphragm 200 installed. In FIG. 5, the diaphragm 200 is shown in a deformed configuration and the valve 500 is open. This is in contrast to the diaphragm 112 shown in FIG. 1 in which diaphragm 112 is in a rest configuration and the valve 100 is closed.

As described above, the flange 202 of the diaphragm 200 is clamped between the upper and lower housings 502 and 504 of the valve 500, attaching the diaphragm 200 by its outer flange and supporting the sealing body 204 and the deformable web 206 within the valve body.

When in its rest configuration (an example of which is shown in FIG. 1), the diaphragm 200 is oriented such that the sealing body 204 contacts and seals against the valve seat 518 of the valve. In this configuration the valve 500 is closed.

Under unbalanced pressure, however, as is shown in FIG. 5, the lower and upper radii 318 and 320 of the gusset 302 deform to displace the sealing body 204 from the valve seat thereby opening the valve. As can also be seen, in the raised configuration the rib 210 of the diaphragm 200 contacts the upper housing 502 of the valve 500 which minimizes the likelihood of the diaphragm 'sticking' in place (i.e. facilitates re-establishing equal pressure and closure of the valve 500).

Materials

While Santoprene™ is a suitable material to manufacture the diaphragm blank 300 from in some circumstances, alternative materials may of course be used. When determining the type of material the desired physical, chemical and mechanical characteristics must be considered. These characteristics will depend on the design and performance parameters of the diaphragm in question. It is envisaged that the following mechanical and physical characteristics will be appropriate for most applications:

fatigue properties (S/N) of greater than or equal to 1.0 MPa fatigue loading at $1.0 \times 10^6$ cycles, preferably, greater than or equal to 1.0 MPa fatigue loading at $5.0 \times 10^6$ cycles and more preferably greater than or equal to 1.0 MPa fatigue loading at $10.0 \times 10^6$ cycles;

flexural modulus in the range of 100 MPa to 150 MPa;

low water absorption;

brittle transition temperature of less than or equal to $-40°$ C.; and heat distortion temperature of greater than or equal to $80°$ C.

As will be appreciated, the provision of the convolutes portions of the deformable web 206 of the diaphragm 200 facilitates flexing of the diaphragm 200. The inventors have found that diaphragms having a deformable web of the S-shaped profile as shown can withstand in excess of 1,000,000 cycles without showing any signs of deterioration significant to the function of the diaphragm. Further, the resilience of material from which diaphragm 200 is constructed and the shape of the deformable web 206 are such that the diaphragm 200 can, in the majority of applications, be used without a return spring for biasing the diaphragm against the valve seat when the valve is to be closed.

Advantageously, Santoprene™ is resistant to a large range of chemicals, making them suitable for use in diaphragms for a wide range of applications. Accordingly, diaphragms composed of Santoprene are suitable for use in a wide variety of applications. This includes applications requiring high purity, such as in the food and pharmaceuticals industries where the valve component materials must satisfy regulatory requirements. This also includes applications where the diaphragm needs to function efficiently between a range of temperatures —for example from approximately $-40°$ C. and $80°$ C.

FIGS. 6A to 6D, and 7A to 7D each provide examples of an alternative embodiment to the diaphragm 200 of FIG. 2. However, it will be appreciated that many further alternative embodiments may be provided. As diaphragms 600 and 700 share similar features to diaphragm 200, the reference numerals adopted for diaphragm 200 have been adopted for corresponding features.

Figure 6A:
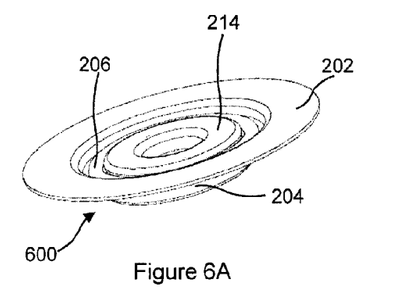
FIG. 6A is a perspective view of a diaphragm in accordance with a second embodiment of the invention.
Figure 6B:
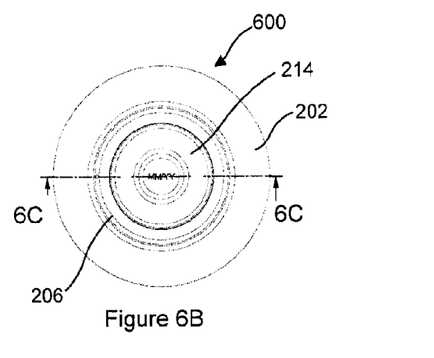
FIG. 6B is a plan view of the diaphragm of FIG. 6A.
Figure 6C:
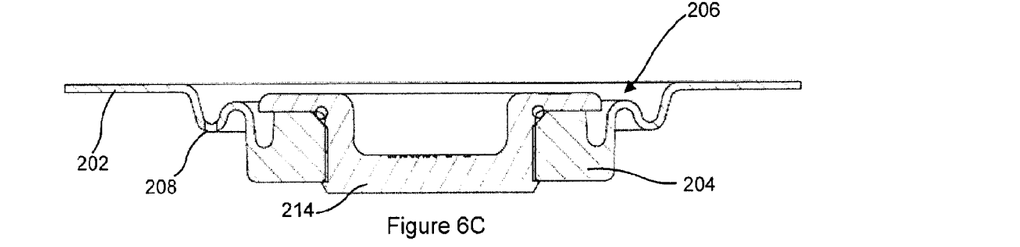
FIG. 6C is a sectional elevation view of the diaphragm of FIGS. 6A and 6B taken along line 6C-6C in FIG. 6B.
Figure 7A:
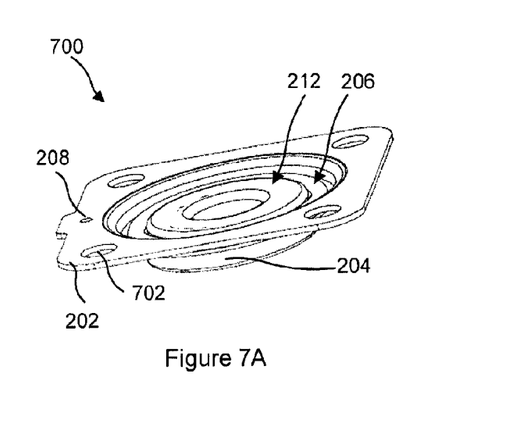
FIG. 7A is a perspective view of a diaphragm in accordance with a third embodiment of the invention.

Each diaphragm 600 and 700 includes a flange 202, a sealing body 204, a deformable web 206 extending between the flange 202 and the sealing body 204, and a reinforcing assembly 212.

In the diaphragm 600 illustrated in FIGS. 6A to 6D, the bleed hole 208 is located in the deformable web 206 (though at the lower radius 318 of the web 206 rather than the upper radius 320 as per diaphragm 200 described above). In the diaphragm 700 illustrated in FIGS. 7A to 7D, the bleed hole 208 is located in the flange 202. Furthermore, it may be observed that neither plug 214 of diaphragm 600 or 700 has a cutting edge.

Figure 7B:
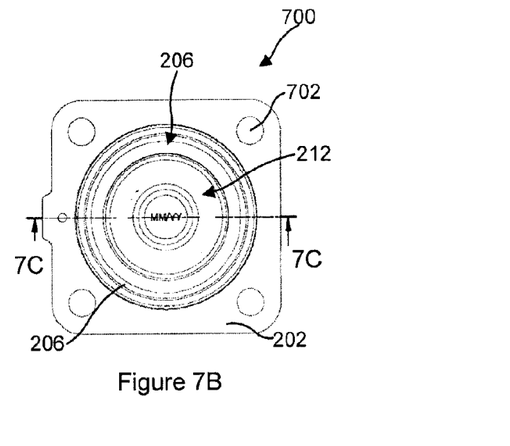
FIG. 7B is a plan view of the diaphragm of FIG. 7A.
Figure 7C:
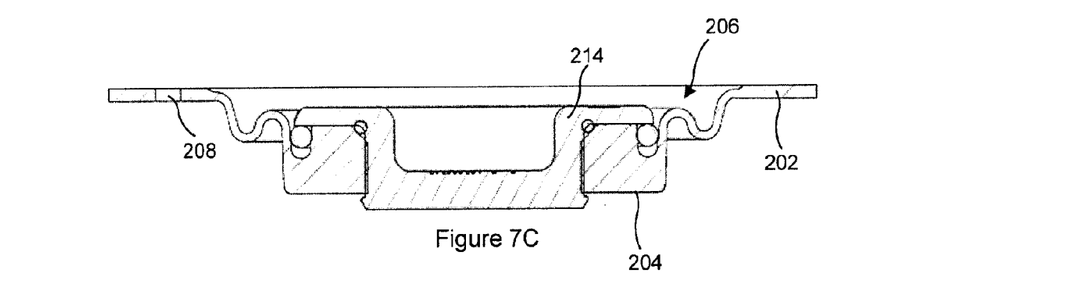
FIG. 7C is a sectional elevation view of the diaphragm of FIGS. 7A and 7B taken along line 7C-7C in FIG. 7B.

Diaphragm 700 is also slightly different to diaphragms 200 and 600 in that outer peripheral shape of the outer flange 202 is essentially square, and is provided with a plurality of mounting apertures 702 which are also used to secure the diaphragm 700 in place in a valve body.

Figure 6D:
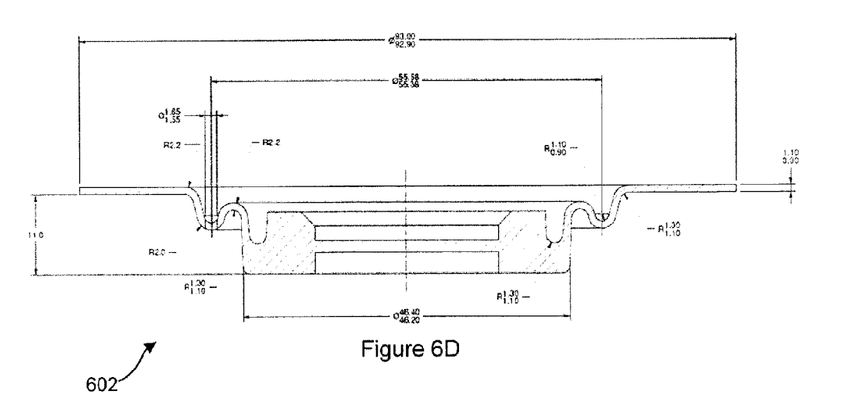
FIG. 6D is the partial section of a diaphragm blank from which the diaphragm of FIG. 6A could be manufactured with various diaphragm parameters shown by way of non-limiting example.

FIG. 6D is a view of diaphragm blank 602 in its natural configuration from which diaphragm 600 is manufactured. FIG. 6D is marked with various measurements (in mm). These measurements are for a diaphragm 600 to be used specifically with a Goyen® RCAC25-series of valves, and are provided by way of non-limiting example only.

Figure 7D:
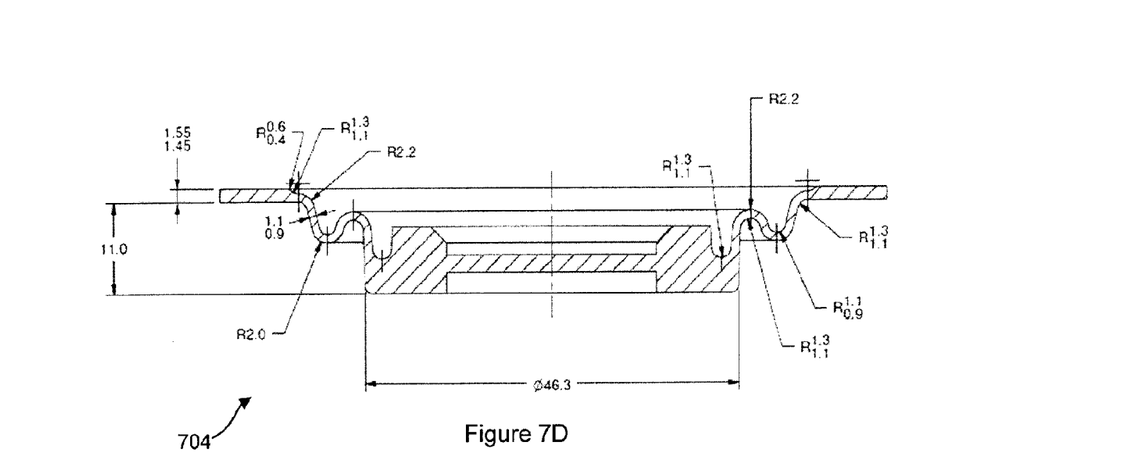
FIG. 7D is the partial section of a diaphragm blank from which the diaphragm of FIG. 7A could be manufactured with various diaphragm parameters shown by way of non-limiting example.

FIG. 7D is a view of diaphragm blank 704 in its natural configuration from which diaphragm 700 is manufactured. FIG. 7D is marked with various measurements (in mm). These measurements are for a diaphragm 700 to be used specifically with a Goyen® CAC25FH3X or RCAC25FH3X series of valves, and are also provided by way of non-limiting example only.

As noted above, the dimension and measurements discussed above and provided in the various figures of this specification are provided by way of non-limiting example only, and will differ according to the specifics of the valve with which the diaphragm is to be used. Considerations which must be taken into account when manufacturing a diaphragm in accordance with the principles of the present invention include, for example:

the distance between the flange and the sealing body of the diaphragm must be compatible with the dimensions of the valve in which the diaphragm is to be used;

the radii/length of the deformable web portion and the flexibility of the material (and the thickness of the material as noted below) from which the diaphragm is constructed must be such that the sealing body can be displaced a sufficient distance under the operational pressures of the valve;

The thickness of the material from which the diaphragm is manufactured must be selected according to the operational pressures of the valve. If the material is too thick the diaphragm may not be flexible enough to allow the valve to open and close, however if the material is too thin the diaphragm will not endure;

the diameter of the bleed hole must be appropriate to allow the appropriate amount of fluid flow through the bleed hole.

the size of the upper and lower radii 318 and 320, and/or the length of the convolute portions 322 and 324 (along with the flexibility of the material itself) are also important as these will determine how far the web 206 will deform/unfold in use, and consequently how far the sealing body 204 will be able to move;

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A diaphragm for a high pressure gas diaphragm valve, the diaphragm comprising:

a sealing body defining a sealing face for seating against a valve seat of the valve to close the valve;

an outer flange for attaching the diaphragm to the valve, the outer flange defining a flange plane;

a deformable web that extends between the outer flange and the sealing body, the deformable web including a gusset that has at least one convolute portion, the deformable web further including an annular groove between the sealing body and the gusset; and an o-ring located in the annular groove between the sealing body and the gusset;

the gusset being deformable to allow the sealing body to move between a natural configuration in which the sealing body is on a first side of the flange plane, and a raised configuration in which at least part of the sealing body is on the opposing side of the flange plane and the at least one convolute portion biases the sealing body towards the natural configuration.

2. A diaphragm according to claim 1, wherein, when the sealing body is in the natural configuration, the surface of the at least one convolute portion has a local extremum that is located between the flange plane and the sealing face.

3. A diaphragm according to claim 1, wherein the gusset includes two convolute portions.

4. A diaphragm according to claim 3, wherein the gusset has a substantially S-shaped radial profile.

5. A diaphragm according to claim 3, wherein, when the sealing body is in the natural configuration, the intersection between the convolute portions is located between the flange plane and the sealing face.

6. A diaphragm according to claim 1, further comprising a bleed hole for allowing gas to pass through the diaphragm.

7. A diaphragm according to claim 6, wherein the bleed hole is located in the deformable web.

8. A diaphragm according to claim 6, wherein the bleed hole is located in the outer flange.

9. A diaphragm according to claim 1, wherein the deformable web further includes at least one rib that protrudes from the gusset on the opposite side of the sealing body to the sealing face and extends partly around the sealing body; and
wherein, when the sealing body is in a raised configuration, the rib spaces the gusset from the valve body and inhibits formation of a seal between the gusset and the valve body.

10. A diaphragm according to claim 1, further comprising a reinforcing plug for reinforcing the sealing body.

11. A diaphragm according to claim 10, wherein the reinforcing plug has a stem that extends at least partially through the sealing body in a direction perpendicular to the flange plane.

12. A diaphragm according to claim 11, wherein the stem extends through the sealing body.

13. A diaphragm according to claim 10, wherein the reinforcing plug further comprises a generally planar flange that abuts the sealing body and is disposed on the opposite side of the sealing body to the sealing face.

14. A diaphragm according to claim 13, wherein, when the sealing body is in the natural configuration, a clearance is provided between the gusset and the radially peripheral edge of the planar flange.

15. A diaphragm according to claim 12, wherein the reinforcing plug includes a detent that projects radially from the stem, the detent for inhibiting movement of the stem through the sealing body in a direction away from the sealing face.

16. A diaphragm according to claim 12, wherein the reinforcing plug comprises a cutting edge that depends from the stem, the cutting edge, during assembly of the diaphragm, cuts an aperture through a central portion of the sealing body.

17. A diaphragm according to claim 1, wherein the outer flange, deformable web, and sealing body are of unitary construction.

18. A diaphragm according to claim 1, wherein the outer flange, web, and sealing body are moulded from a thermoplastic material.

19. A diaphragm according to claim 13, wherein the reinforcing plug is manufactured from a co-polymer acetyl material.

20. A diaphragm for a high pressure gas diaphragm valve, the diaphragm comprising:
a sealing body defining a sealing face for seating against a valve seat of the valve to close the valve;
an outer flange for attaching the diaphragm to the valve, the outer flange defining a flange plane;
a deformable web that extends between the outer flange and the sealing body, the deformable web including a gusset that has at least one convolute portion, the deformable web further including at least one substantially annular rib that protrudes from the gusset on the opposite side of the sealing body to the sealing face and extends circumferentially at least partly around the sealing body along a substantially annular line; and
a bleed hole for allowing gas to pass through the diaphragm, the bleed hole being disposed in line with the at least one rib along the substantially annular line;
the gusset being deformable to allow the sealing body to move between a natural configuration in which the sealing body is on a first side of the flange plane, and a raised configuration in which at least part of the sealing body is on the opposing side of the flange plane and the at least one convolute portion biases the sealing body towards the natural configuration; and
the rib, when the sealing body is in the raised configuration, spacing the gusset from the valve body to inhibit formation of a seal between the gusset and the valve body.

* * * * *